(12) United States Patent
Awad

(10) Patent No.: US 6,948,642 B2
(45) Date of Patent: Sep. 27, 2005

(54) APPARATUS AND METHOD FOR DISPENSING FLUIDS INTO AN AIR INTAKE

(76) Inventor: Adam Awad, 160 Fairhaven La., Costa Mesa, CA (US) 92626

( * ) Notice: Subject to any disclaimer, the term of this patent is extended or adjusted under 35 U.S.C. 154(b) by 47 days.

(21) Appl. No.: 10/666,578

(22) Filed: Sep. 17, 2003

(65) Prior Publication Data

US 2005/0056342 A1 Mar. 17, 2005

(51) Int. Cl.$^7$ ............................................. B67D 5/00
(52) U.S. Cl. .................... 222/519; 222/80; 222/153.04; 222/153.14; 222/191; 222/320; 222/482; 141/329
(58) Field of Search ............................. 222/80, 153.04, 222/153.13, 153.14, 191, 320, 478, 480, 481, 482, 488, 489, 519–521; 141/329

(56) References Cited

U.S. PATENT DOCUMENTS

| | | | | |
|---|---|---|---|---|
| 1,472,123 A | * | 10/1923 | Heinitsh | 222/320 |
| 1,565,778 A | | 12/1925 | Bird | 422/306 |
| RE16,425 E | | 9/1926 | Bird | 123/198 A |
| 2,829,808 A | * | 4/1958 | Bodkin | 222/421 |
| 3,108,721 A | * | 10/1963 | Nebinger | 222/402.25 |
| 3,557,763 A | | 1/1971 | Probst | 123/199 |
| 4,610,374 A | * | 9/1986 | Buehler | 222/83 |
| 4,732,329 A | | 3/1988 | Martin | 239/542 |
| 4,884,705 A | * | 12/1989 | Debetencourt | 215/250 |
| 5,097,806 A | | 3/1992 | Vataru et al. | 123/198 A |
| 5,257,604 A | | 11/1993 | Vataru et al. | 123/198 A |
| 5,727,514 A | | 3/1998 | Sunden | 123/198 A |
| 5,826,602 A | | 10/1998 | Chen | 134/20 |
| 5,904,275 A | * | 5/1999 | Suffa | 222/494 |
| 5,970,994 A | | 10/1999 | Sasaki et al. | 134/102.1 |
| 6,073,638 A | | 6/2000 | Sasaki et al. | 134/22.18 |
| 6,178,977 B1 | | 1/2001 | Wells | 134/102.1 |
| 6,530,392 B2 | | 3/2003 | Blatter et al. | 137/240 |
| 6,681,796 B2 | * | 1/2004 | King, Jr. | 137/318 |
| 2003/0015554 A1 | | 1/2003 | Gatzke | 222/181.2 |

* cited by examiner

Primary Examiner—J. Casimer Jacyna
(74) Attorney, Agent, or Firm—Gene Scott and Patent Law & Venture Group

(57) ABSTRACT

An apparatus and method for dispensing fluids into an air line comprises a container having a valve so as to selectively open the container to allow flow of fluids therefrom, the container being configured with a circumferential channel and with a circumferential groove about its perimeter. The apparatus further comprises a cap having a ring configured to engage the groove so as to rotatably mount the cap onto the container, the cap being further configured with a post formed so as to selectively engage the channel and selectively allow the cap to move axially along the container to actuate the valve. A nozzle extends longitudinally from the cap and is configured with multiple apertures and a spiral thread thereabout so as to be threadably inserted into the air line and dispense fluids therein upon actuation of the valve.

16 Claims, 6 Drawing Sheets

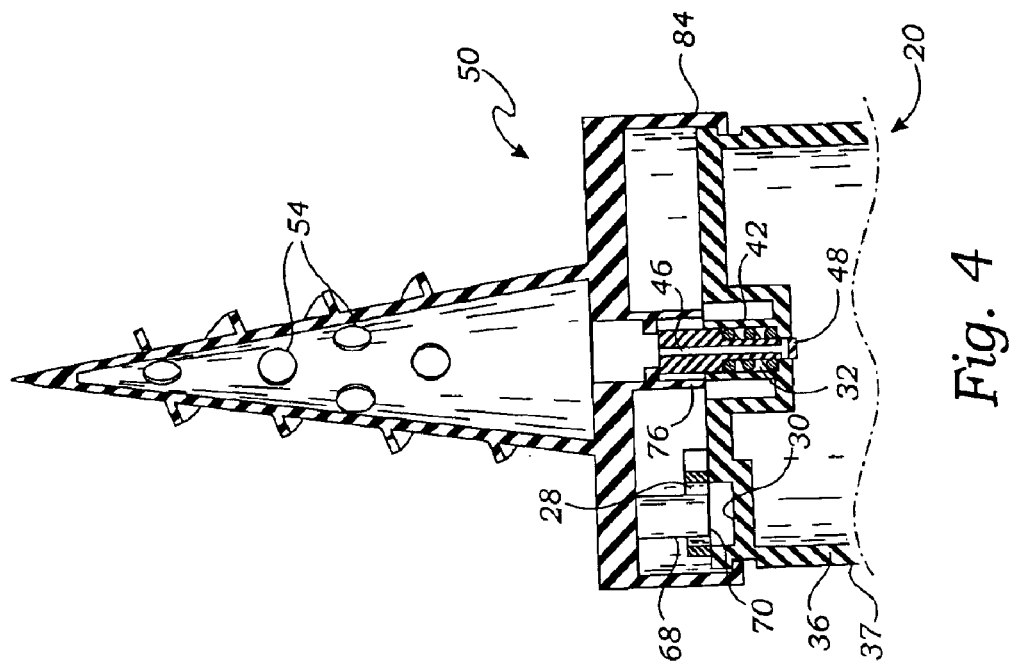
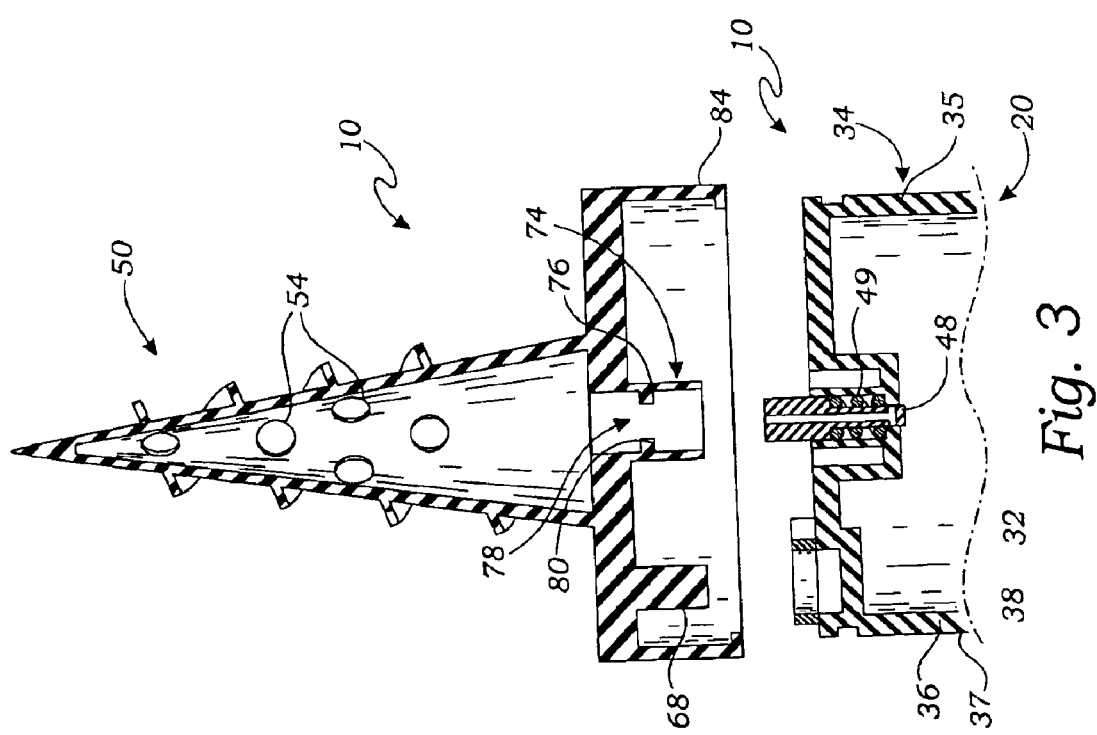

APPARATUS AND METHOD FOR DISPENSING FLUIDS INTO AN AIR INTAKE

BACKGROUND OF THE INVENTION

Incorporation By Reference:

Applicant hereby incorporates herein by reference, any and all U.S. patents, U.S. patent applications, and other documents and printed matter cited or referred to in this application.

1. Field of the Invention:

This invention relates generally to fluid dispensing systems, and more particularly to an apparatus and method for dispensing fluids into an engine injector system.

2. Description of Related Art:

The following art defines the present state of this field:

Bird, U.S. Pat No. Re. 16,425 and U.S. Pat. No. 1,565,778 each describes a hollow cylindrical chamber adapted to contain a chemical element having a means at the outer end of the chamber which is adapted to admit air over the chemical element, the said means comprising a removable threaded cap member, which is provided at its center portion with a threaded stem, and carries on its inner end a removable spring member, and a valve member disposed between the spring and the cap whereby the valve element may be adjustably tensioned against the under surface of the cap member.

Probst, U.S. Pat. No. 3,557,763 describes an apparatus for supplying an additive vapor into the fuel-air mixture of an internal combustion engine including a reservoir for a liquid solution including methanol. The reservoir is connected to the engine by a flexible conduit defining a suction line connected to the primary vacuum inlet of the engine. The reservoir includes an inlet conduit for bubbling air through the solution to produce a vapor in the upper reservoir chamber, which is drawn into the engine inlet through the suction conduit. A check valve in the suction line maintains the reduced pressure in the reservoir during times of increased pressure in the engine primary vacuum inlet.

Martin, U.S. Pat. No. 4,732,329 describes an irrigation dripper having a screw threaded shank terminating in a head. The shank is tapered and has an axially extending groove or slit formed on the shank, which in use is fitted in a hole formed in a pipe. Water from the pipe is discharged through the slit for irrigating plants.

Vataru et al., U.S. Pat. No. 5,097,806 describes a method of cleaning an internal combustion engine fuel injector structure, valves and combustion chambers, which employs a canister containing a liquid mixture that includes engine fuel and injector cleaning solvent. The method provides the steps of charging pressurized gas into the canister to a selected high-pressure level; communicating the interior of the canister with a passage extending to the injector structure and operating the engine to provide pressurized fuel discharge delivered to the passage; terminating operation of an engine fuel pump; continuing operation of the engine and flow of the mixture in the canister to the injector structure until the mixture in the canister depletes; and re-charging pressurized gas into the canister to a selected high-pressure level, and continuing flow of the mixture to the injector structure while the engine is running.

Vataru et al., U.S. Pat. No. 5,257,604 describes a method of cleaning an internal combustion engine fuel injector structure, valves and combustion chambers, which employs a canister containing a liquid mixture that includes engine fuel and injector cleaning solvent. The method provides the steps of charging pressurized gas into the canister to a selected high-pressure level; communicating the interior of the canister with a passage extending to the injector structure and operating the engine, including a fuel pump to provide pressurized fuel discharge which is delivered to the passage; terminating operation of the fuel pump; continuing operation of the engine by allowing substantially continuous pressurized flow of the mixture in the canister to the injector structure, via the passage, and until the mixture in the canister depletes; and after pressure drops to a selected lower level, re-charging pressurized gas into the canister to a selected high-pressure level, and continuing the communication of the canister interior with the passage to flow more of the mixture to the injector structure while the engine is running.

Sunden, U.S. Pat. No. 5,727,514 describes an anti-corrosion fogging device for internal combustion engines, such as marine engines, including a system, which injects oil having anti-corrosive properties into the engine of a boat. The device may be applied to two cycle outboard motors as well as four-cycle engines. The system dispenses the anti-corrosive oil by means of an aerosol spray can permanently connected to a remotely controlled solenoid valve which through a hose supplies oil to a spray nozzle permanently installed on the engine. A user can, at will, dispense a controllable quantity of anti-corrosive oil into an internal combustion engine at the end of an operating cycle to protect the engine against corrosion during prolonged idleness.

Chen, U.S. Pat. No. 5,826,602 describes an improved process and apparatus for flushing carbon deposits and contaminants from fuel and air intake systems of an internal combustion engine. The process includes replacing the regular fuel supply with a mixture of fuel and a cleaning agent, operating the engine at idle speed and introducing another cleaning agent through the air intake system. The first and second cleaning agents can be of the same or different composition. By simultaneously introducing cleaning agents through the fuel supply system and the air intake system, the process combines the two cleaning agents on the surface area around the intake valves, the combustion chambers and other critical areas to remove stubborn carbon deposits.

Sasaki et al, U.S. Pat. Nos. 5,970,994 and 6,073,638 each describes an apparatus and method for cleaning the intake system of an internal combustion engine, such as an automobile engine, employing intake manifold vacuum of the running engine to ingest and atomize a liquid cleaner using a bleed of ambient air. Atomizing of the liquid cleaner provides better dispersion of the cleaner to surfaces of the intake system of the engine, and prevents puddling of the liquid in low spots of the intake system.

Wells, U.S. Pat. No. 6,178,977 describes a method and device for cleaning the components of an internal combustion engine. The device provides a single valve for regulating the flow and blend of air and cleaning fluid entering the combustion chamber of an internal combustion engine. The invention provides a novel device and process for cleaning mineral deposits from the surface of the combustion chamber, piston crown and intake ports, intake valves. The flow control valve is capable of regulating the flow of air and cleaning fluid into the combustion chamber of an internal combustion engine during the cleaning process. The device of the present invention connects two separate hoses to a flow control valve. The end of one of the hoses is placed within a reservoir of cleaning fluid. The end of the other hose is connected to vacuum port of an internal combustion engine. Thus, the device provides a path for the cleaning fluid to pass from the reservoir through the flow control valve, through the vacuum port of the engine, through the intake manifold onto the combustion chamber, and out the engine's exhaust.

Blatter et al., U.S. Pat. No. 6,530,392 describes a valve cleaning apparatus and method for transporting a cleaning fluid from a supply tank into the air intake valves of a combustion engine. It comprises housing having a pair of legs and a closed end. The housing has a flow path through the housing. A valve is located collinear with the flowpath. The valve cleaning apparatus also includes tubing, a nozzle and a hook to hang the assembly from the hood of a car.

Gatzke, U.S. 2003/0015554 describes a fluid-dispensing device attachable to an air-intake system of an internal combustion engine for introducing an engine cleaner composition into the air intake system. The invention also provides methods of cleaning internal combustion engines using the fluid-dispensing devices.

Engine Fog, Inc., WO 95/28236 describes an engine cleaner composition and method for removing carbonaceous deposits from engine fuel-system components such as mechanical and electronic fuel injectors, intake valve seats, valves, combustion cylinders, spark plugs, and oxygen sensors that may be used on both gasoline and diesel engines. Preferred compositions comprise a synergistic solution of a heterocyclic ring compound in an azeotrope of acetonitrile and water, together with selected surfactants and aromatics. Preferred compositions of the invention may be placed in an aerosol-pressurized unit utilizing a compressed gas, such as nitrogen or nitrous oxide, or compressed liquid gas, such as a hydrocarbon or fluorohydrocarbon. Preferred engine-cleaning compositions of the invention are substantially non-ozone depleting, are low in global warming, and have a low order of human toxicity. Preferred compositions have a moderate pH and are essentially compatible with metals and elastomers conventionally used in engine fuel-system components. The invention provides a consumer or a professional engine mechanic with a safe, easy and efficient way to clean engine fuel-system components.

Our prior art search with abstracts described above teaches a carbon removing attachment for internal combustion engines, a vapor injector, an irrigation dripper, a multi-mode engine cleaning fluid application apparatus and method, a remote controlled intermittent user activated anti-corrosion fogging device for infrequently used internal combustion marine engines, a process and apparatus for flushing carbon dioxide deposits and contaminants from the fuel and air intake systems of an internal combustion engine, method and apparatus for cleaning an automotive engine, a device for cleaning deposits from an internal combustion engine, a valve cleaning assembly, a method of cleaning an internal combustion engine using an engine cleaner composition and fluid-dispensing device for use in said method, and an engine cleaner composition, method, and apparatus, but does not teach a fluid dispensing apparatus having a container on which a cap is rotatably mounted so as to cooperate with the container to selectively shift the apparatus from a locked and closed position to an unlocked and open position, or a nozzle mounted on the cap having multiple apertures and spiral threads to aid the nozzle in more effectively seating and disbursing fluids. The present invention fulfills these needs and provides further related advantages as described in the following summary.

SUMMARY OF THE INVENTION

The present invention teaches certain benefits in construction and use which give rise to the objectives described below.

The present invention is a fluid dispensing apparatus generally comprising a container and a cap rotatably mounted thereon. The container has a valve so as to selectively open the container to allow flow of fluids therefrom and is formed on an upwardly-facing surface with a stepped circumferential channel having an upwardly-opening depression formed along a portion thereof. The container is further formed with a circumferential groove about its perimeter. The cap is formed with a ring configured to engage the groove so as to rotatably mount the cap onto the container. The cap is further formed with a longitudinally-projecting conical nozzle having a plurality of apertures in fluid communication with the valve. The cap is further formed with a downwardly-projecting post having a distal post end configured to project into the channel when the cap is rotatably mounted onto the container.

In use, the fluid dispensing apparatus is first configured in its closed and locked position by rotating the container relative to the cap to engage the distal post end with the channel and prevent axial movement of the container relative to the cap, thereby preventing actuation of the valve. The cap's conical nozzle is then threadably inserted into a hole formed in an engine air line, and the container is rotated relative to the cap to position the distal post end adjacent to the depression so as to unlock the apparatus. Next, the container is shifted axially toward the cap to actuate the valve and allow fluid flow through the nozzle and into the air line. Once the desired amount of fluid has been dispensed, the container is shifted axially away from the cap and rotated relative to the cap to again engage the distal post end with the channel to prevent axial movement of the container relative to the cap and thereby close the valving means and prevent further fluid flow. The nozzle is then threadably removed and a plug inserted into the hole.

In an alternative embodiment, the fluid dispensing apparatus comprises a container and a conical nozzle interconnected by a fluid line so as to be in selective fluid communication as controlled by a valve mounted in the fluid line and positioned within a passenger compartment of a vehicle. With the nozzle seated within a hole in an air line, the valve is manipulated to control fluid flow from the container into the air line. A primary objective of the present invention is to provide an apparatus and method of use of such apparatus that provides advantages not taught by the prior art.

Another objective is to provide such an invention capable of selectively locking and closing or unlocking and opening by a simple partial rotation of a container cap.

A further objective is to provide such an invention capable of threadably engaging an engine air line and effectively disbursing a fluid therein in a highly efficient manner.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 3 is a cross-sectional view thereof taken along line 3—3 of FIG. 2;

FIGS. 4 and 5 are partial cross-sectional views thereof taken along line 4—4 of FIG. 1 and showing a cap of the invention in a locked and closed position and in an unlocked and open position, respectively;

DETAILED DESCRIPTION OF THE INVENTION

The above described drawing figures illustrate the invention in at least two of its preferred embodiments, which are further defined in detail in the following description.

Figures 1, 2:
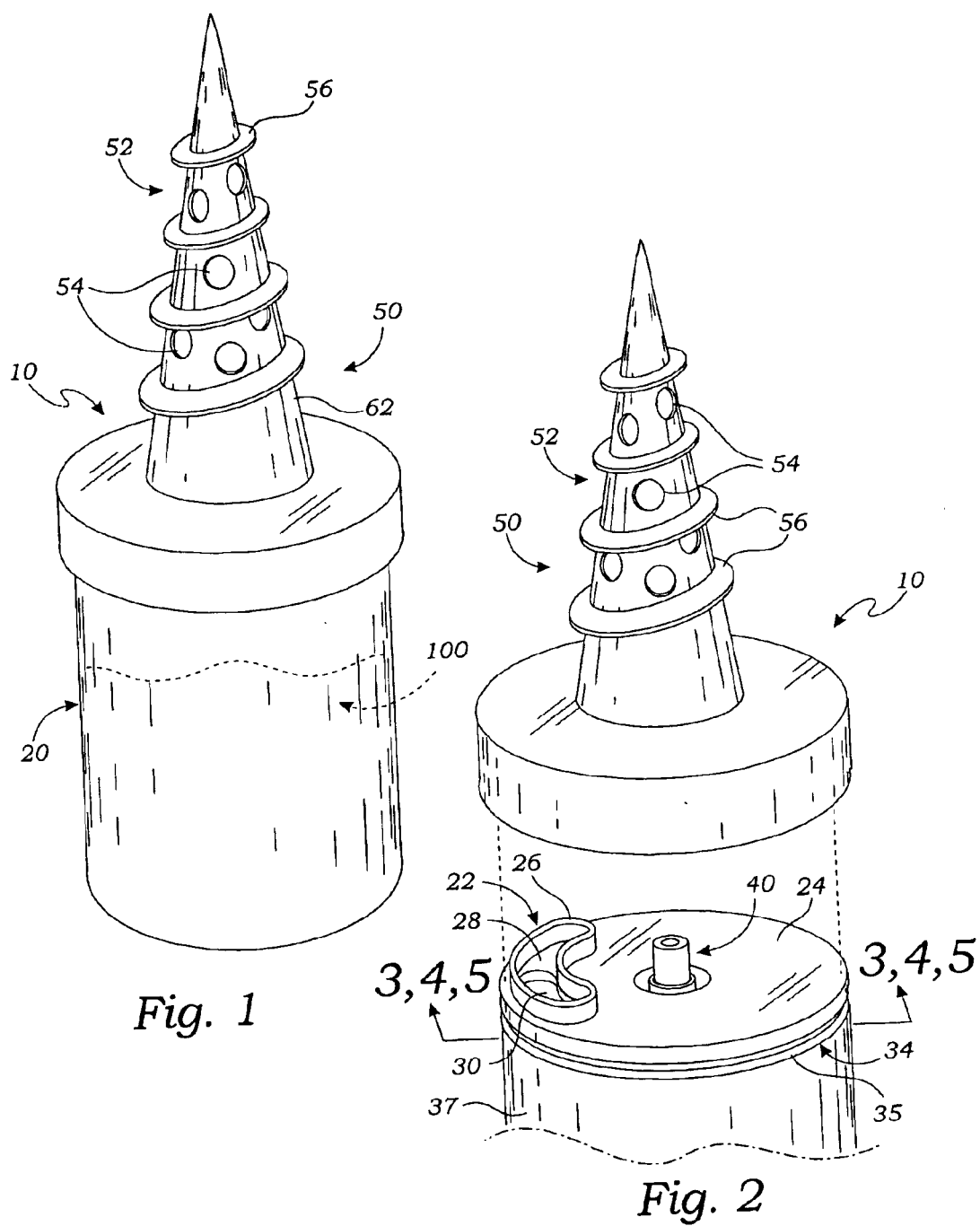
FIG. 1 is a perspective view of the preferred embodiment of the invention.
FIG. 2 is a partial, exploded perspective view thereof.
Figure 5:
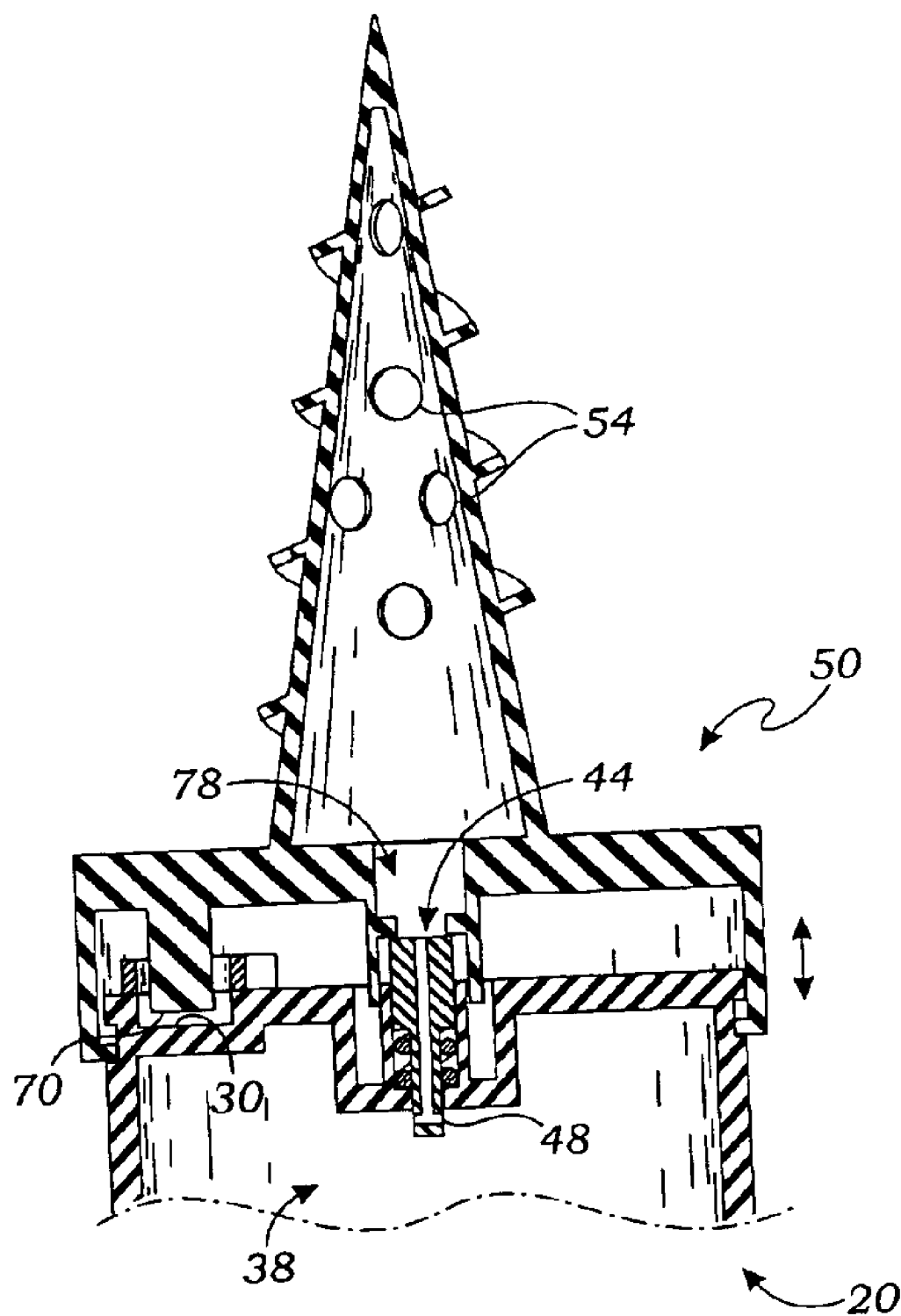

The present invention is a fluid dispensing apparatus 10 for dispensing fluids into the air intake of an injector system 92 of an engine 90 (FIG. 6), the apparatus 10 generally comprising a container 20 and a cap 50 rotatably mounted on the container 20. The container 20 is formed with an internal reservoir 38 (FIG. 3) in which the fluid 100 is housed. The cap 50 is formed with a longitudinally-projecting conical nozzle 52. Apertures 54 are formed in the nozzle, and a spiral thread 56 is formed about the outer surface 62 of the nozzle, the features and benefits of which are described more fully below. As shown in FIGS. 2 and 3, the container 20 is formed on an outwardly-facing surface 24 with a circumferential stepped channel 26 having an upwardly-facing channel surface 28 and a depression 30 formed along a portion of the channel 26. The cap 50 is formed with a post 68 projecting from the cap 50 so as to extend into the channel 26 when the cap 50 is rotatably mounted on the container 20. Thus, as explained in more detail below, the channel 26 and the post 68 cooperate to lock and unlock the cap so as to selectively allow the cap 50 to move axially upon the container 20 in controlling the flow of fluid 100 from the container 20. As best shown in FIGS. 4 and 5, the post 68 has a distal post end 70 configured to contact the channel surface 28 when the cap 50 is rotatably mounted onto the container 20, whereby rotation of the cap 50 upon the container 20 in a first rotational direction to a locked position selectively engages the distal post end 70 with the channel surface 28 so as to prevent axial movement of the cap 50 relative to the container 20 (FIG. 4), and whereby rotation of the cap 50 upon the container 20 in an opposite second rotational direction to an unlocked position selectively positions the distal post end 70 within the channel 26 (FIG. 2) adjacent to the depression 30 so as to allow axial movement of the cap 50 toward the container 20 (FIG. 5), as explained more fully below: It will be appreciated by those skilled in the art that numerous other configurations and locations of the channel 26 and post 68, both now known and later developed, may be employed without departing from the spirit and scope of the present invention. The container 20 is formed with a valve 40 so as to selectively open the container 20 to allow flow of fluids therefrom, and the cap 50 is formed with an actuation device 74 configured to engage the valve 40 when the cap 50 is moved axially toward the container 20, as when the cap 50 is rotated to its unlocked position. In the preferred embodiment, the valve 40 comprises a piston 42 axially shiftable between a closed position and an open position. The container 20 is formed with a piston bore 32 in which the piston 42 is slidably positioned. The piston 42 is configured with a through-passage 44 communicating generally between the proximal and distal ends of the piston 42 and having a longitudinal lumen 46 intersecting a transverse lumen 48 so as to form an inverted T-shaped cross-section. The actuation device 74 comprises a tubular member 76 having an inner lumen 78 formed with at least one inwardly-projecting tab 80 configured to engage the piston 42 and shift the piston 42 to the open position upon axial movement of the cap 50 toward the container 20. Referring again to FIGS. 4 and 5, the longitudinal lumen 46 is configured to intersect the distal end of the piston 42 and be in fluid communication with the inner lumen 78 of the tubular member 76. The transverse lumen 48 is configured to intersect the piston 42 at its proximal end and alternately be sealed by the piston bore 32 when the piston 42 is in the closed position and be clear of the piston bore 32 and in fluid communication with the container's reservoir 38 when the piston 42 is in the open position so as to cause the reservoir 38 to be in fluid communication with the inner lumen 78 through the through-passage 44. The nozzle 52 is mounted on the cap 50 such that the apertures 54 are in fluid communication with the inner lumen 78, thereby allowing the fluid 100 flowing from the reservoir 38 when the piston 42 is shifted to its open position, as dictated by the axial movement of the cap 50 toward the container 20, to be disbursed by the nozzle 52, as explained more fully below. A compression spring 49 is installed within the apparatus 10 so as to engage the piston 42 and the container's piston bore 32 and thereby bias the piston 42 toward the closed position. Those skilled in the art will appreciate that numerous other valves, such as gate and globe valves, may be employed in the present invention to cooperate between the cap 50 and the container 20 to selectively allow fluid flow in response to the axial movement of the cap 50 on the container 20. The apparatus 10 of the present invention is further configured such that the container 20 has a circumferential groove 35 formed so as to engage a ring 86 formed on the cap 50 so as to rotatably mount the cap 50 onto the container 20. In the preferred embodiment, the container 20 is formed with a substantially cylindrical wall 36 so as to have a cylindrical outer surface 37 in which the outwardly-opening circumferential groove 35 is formed. The cap 50 is formed with a downwardly-projecting tubular skirt 84 having an inner surface 85 configured to be positioned circumferentially about a portion of the outer surface 37 when the cap 50 is rotatably mounted on the container 20, such that the circumferential ring 86 is formed so as to project inwardly from the inner surface 85 and engage the groove 35. It will be appreciated by those skilled in the art that the width of the groove 35 is greater than the width of the ring 86 so as to allow the ring 86 to axially slidably engage the groove 35, whereby the cap 50 may move axially on the container 20 as limited by the engagement of the ring 86 within the groove 35. It will be further appreciated that other means for engaging the cap 50 with the container 20 so as to allow rotational and axial movement therebetween, such as a threaded connection, a snap-fit, or an interference-, press-, or frictional-fit, may be employed without departing from the spirit and scope of the present invention.

Figure 6:
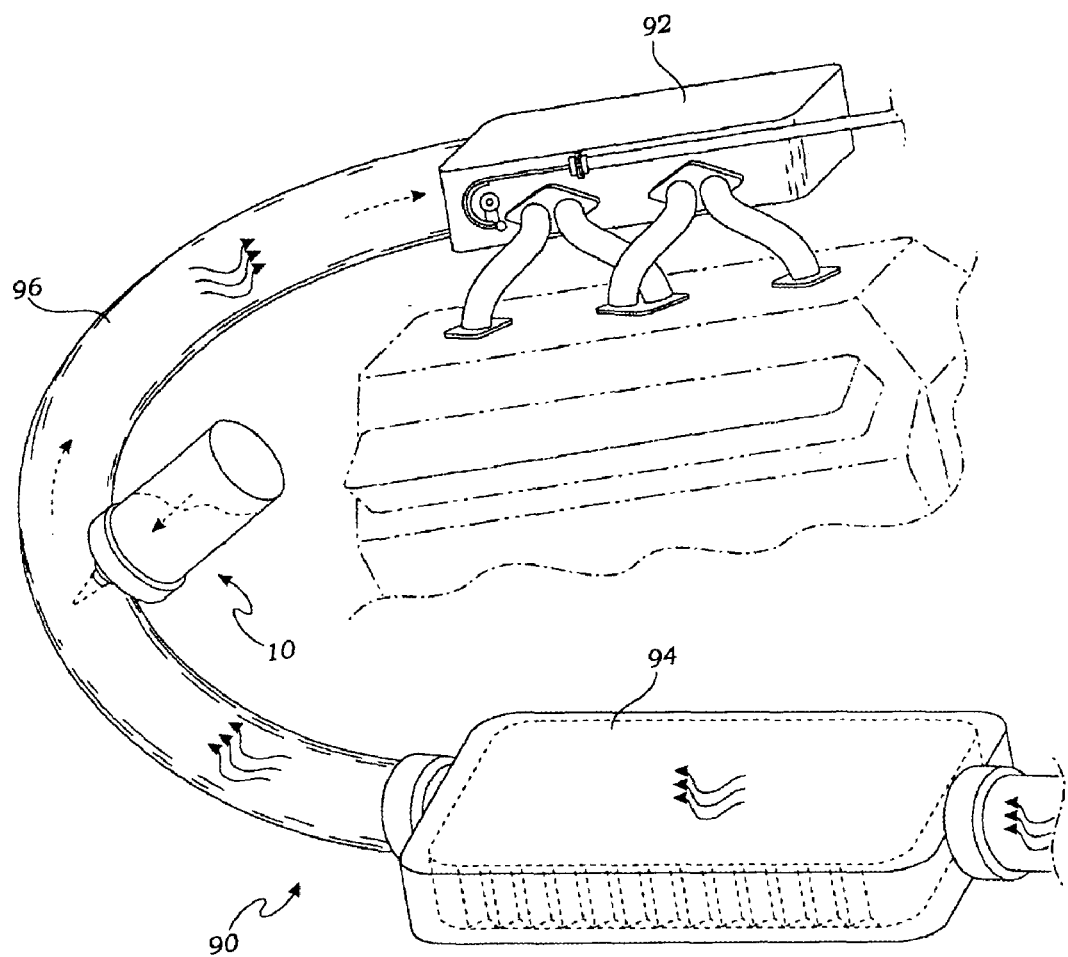
FIG. 6 is a perspective view thereof as applied to a conventional internal combustion engine.
Figure 7:
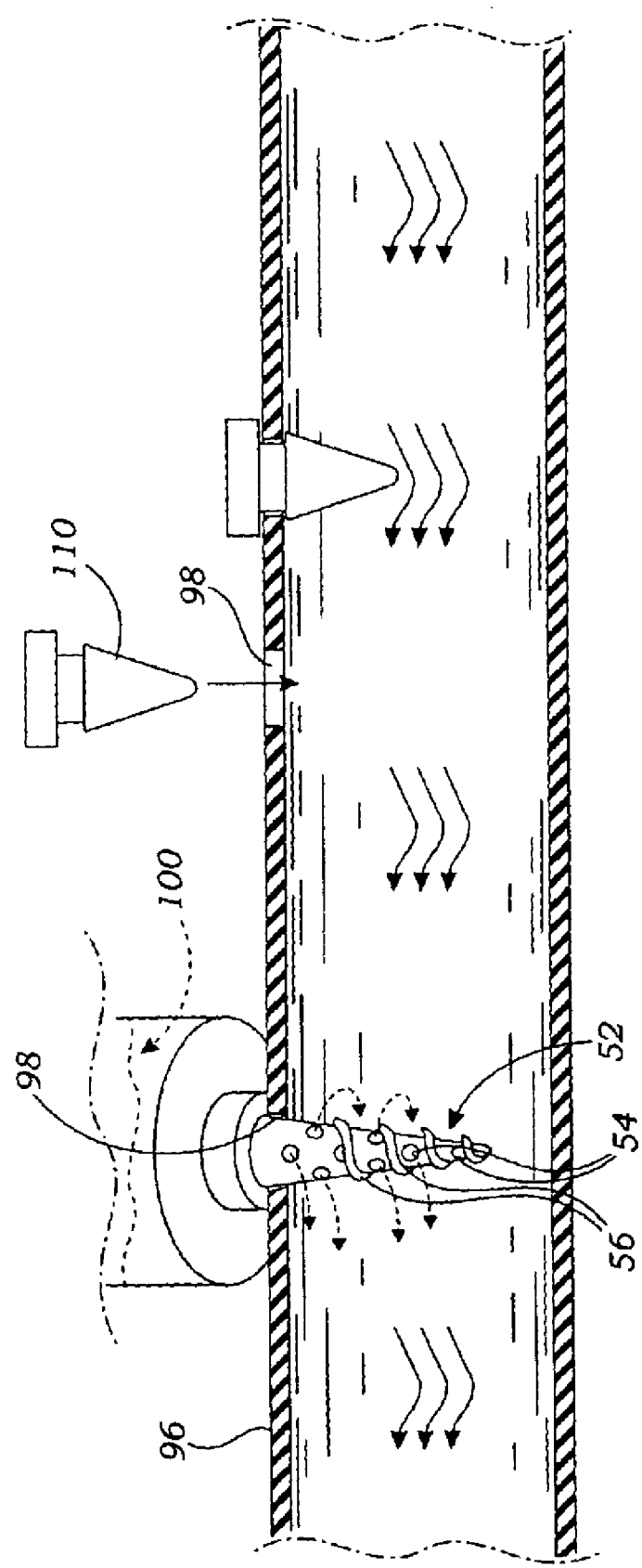
FIG. 7 is a partial cross-sectional view demonstrating a use of the invention with a fluid conducting tube.
Figure 8:
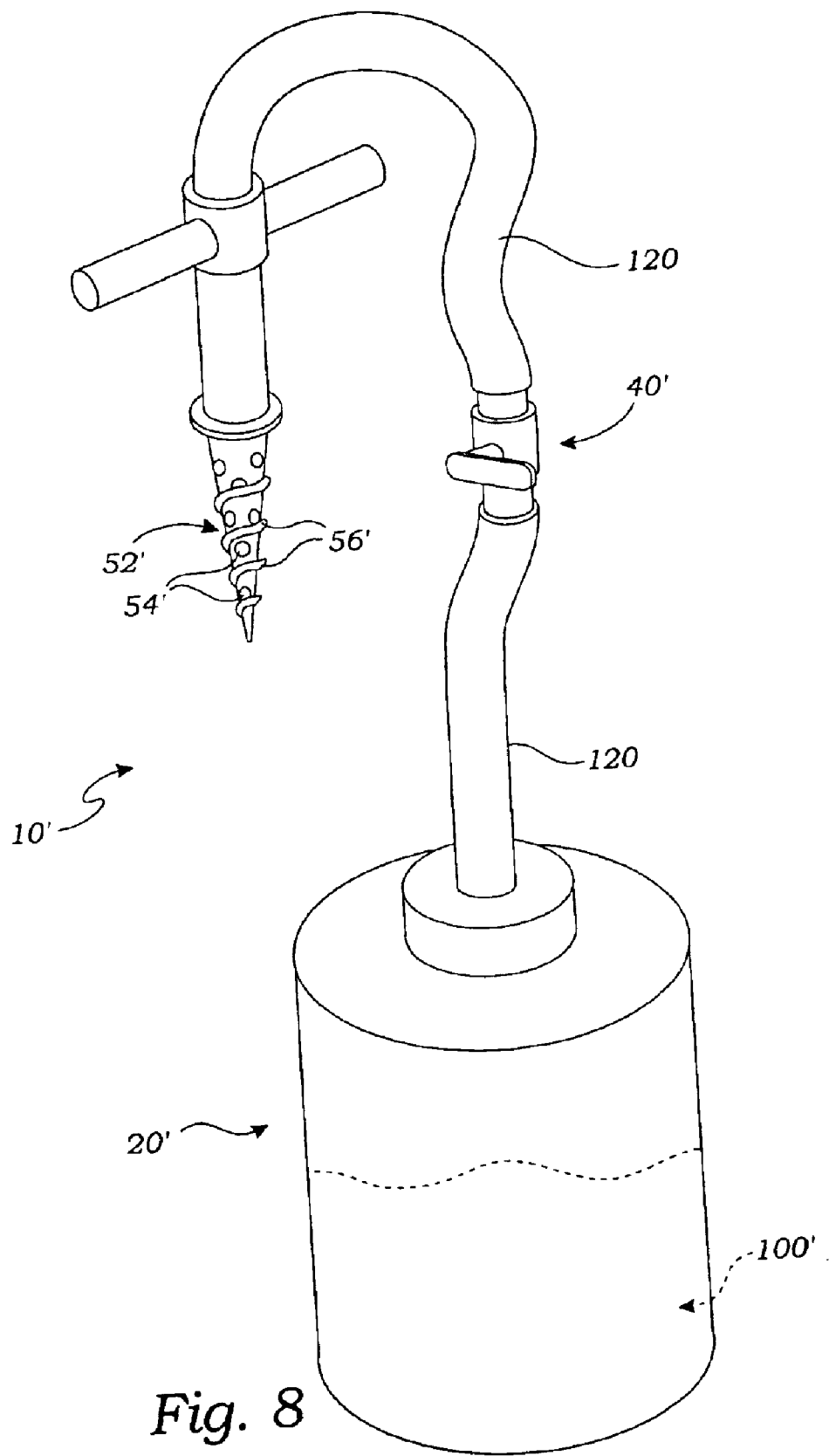
FIG. 8 is a perspective view of an alternative embodiment of the invention.

In use, the fluid dispensing apparatus 10 of the present invention is first configured in its closed and locked position by rotating the container 20 relative to the cap 50 to engage the distal post end 70 with the channel surface 28 and prevent axial movement of the container 20 relative to the cap 50, thereby preventing actuation of the valving means 40. This will preserve the fluid 100 within the container's reservoir 38 until the apparatus 10 is in position and fluid dispensing is desired. Referring to FIGS. 6 and 7, with the apparatus 10 so configured, a hole 98 is formed in an air line 96 on the intake side of the injector system 92 of an engine 90. The conical nozzle 52 is inserted into the hole 98 by twisting the apparatus 10 as it is advanced so as to engage the spiral threads 56 with the hole and securely seat the apparatus 10 therein. It will be appreciated that the nozzle 52 itself may be used to form the hole 98 as it pierces and is threaded into the air line 96, thereby eliminating the need for a separate drilling or other hole-forming step. Once the apparatus 10 is fully seated, the container 20 is rotated relative to the cap 50 to position the distal post end 70 adjacent to the depression 30 (FIG. 5). With the apparatus 10 in this unlocked position, the container 20 is shifted axially toward the cap 50 to cause the actuating device 74 to actuate the valve 40 and allow fluid flow from the reservoir 38 and through the nozzle's apertures 54 into the air line 96. It will be appreciated by those skilled in the art that the plurality of apertures 54 about the conical nozzle 52 improves fluid disbursement by allowing the air flow to pass through the apertures 54 and achieve more surface contact with the fluid 100 so as to pick up the fluid 100 and carry it toward the injector 92. Those skilled in the art will also appreciate that the air flow from the air source 94 through the air line 96 during operation of the engine 90 serves to create a vacuum pressure in the line 96 that will pull the fluid 100 out of the reservoir 38 and carry it to the injector 92. Even without a vacuum pressure, the fluid 100 may be gravity-fed or be pressurized within the container 20 to assist in dispensing. It will be further appreciated that the fluid 100 may be a cleaning agent, an engine-performance-enhancing fluid such as nitrol or liquid hydrogen, or any other such fluid suitable for dispensing into the engine injector system. Once the desired amount of fluid 100 has been dispensed, the container 20 is shifted axially away from the cap 50 and rotated relative to the cap 50 to again engage the distal post end 70 with the channel surface 28 to prevent axial movement of the container 20 relative to the cap 50 and thereby close the valve 40 and prevent further fluid flow (FIG. 4). The nozzle 52 is then threadably removed from the hole 98. A plug 110 is inserted into the hole 98 to seal the air line 96 so as to maintain engine performance. It will be appreciated by those skilled in the art that the apparatus 10 of the present invention is thus easily and effectively employed to dispense fluids 100 into an engine injector system 92. Specifically, the cooperation of the locking cap 50 with the container 20 to selectively actuate the valve 40 and thereby control fluid flow is a secure and simple means of dispensing such fluids 100 that is a significant contribution to the art.

An alternative embodiment of the fluid dispensing apparatus 10' of the present invention comprises a container 20', a conical nozzle 52' in selective fluid communication with the container 20', and a valve 40' mounted between the container 20' and the nozzle 52' so as to selectively control the flow of fluids 100' from the container 20' to the nozzle 52'. The nozzle 52' again is formed with a plurality of apertures 54' and with a spiral thread 56' on the outer conical surface 62' so as to be inserted within an air line 96 (FIG. 6). A fluid line 120 is attached to the container 20' and to the nozzle 52' so as to communicate therebetween, and the valve 40' is installed in the fluid line 120. As such, in use of the alternative apparatus 10', once the nozzle 52' is seated within a hole 98 in an air line 96, the valve 40' may be manipulated from a closed position to an open position to allow the fluid 100' housed within the container 20' to flow through the fluid line 120 and the nozzle 52' and into the air line 96 to be dispensed to the injector 92. In an exemplary embodiment, the valve 40' is positioned within a passenger compartment of a vehicle (not shown). Those skilled in the art will appreciate that such positioning of the valve 40' allows an operator of a vehicle to control the flow of fluid 100' into the injector 92 while operating the vehicle. It will be further appreciated that the present invention is then particularly well-suited for dispensing an engine-performance-enhancing fluid such as nitrol or liquid hydrogen into the injector 92 while operating the vehicle so as to boost performance. When the desired amount of fluid 100' is dispensed, the valve 40' is closed so as to prevent further flow of fluid 100' from the container 20'. Furthermore, though the present invention in each of its exemplary embodiments is shown and described as being used in connection with dispensing fluids into a vehicle's injection system through the air line, it will be appreciated by those skilled in the art that numerous other uses of the present invention, including, but not limited to, the injection of fluids into a vehicle's radiator or air conditioning system, may be made without departing from the spirit and scope of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. An apparatus for dispensing fluids into an air line, comprising:

a container having a means for valving so as to selectively open the container to allow a flow of fluids therefrom, the container being configured with a first means for locking and with a first means for engaging; and a cap having a second means for engaging configured to engage the first engaging means so as to rotatably mount the cap onto the container, the cap being configured with a second means for locking for selectively engaging the first locking means so as to selectively allow the cap to move axially along the container, the cap being further configured with a means for actuating the valving means when the cap is moved axially toward the container.

2. The apparatus of claim 1 wherein:

the first locking means comprises a stepped channel formed in an outwardly-facing surface of the container; and the second locking means comprises a post projecting from the cap so as to extend into the channel.

3. The apparatus of claim 2 wherein:

the container is formed with an upwardly-facing surface;

the channel is formed on the upwardly-facing surface so as to have an upwardly-facing channel surface, the channel being further formed as a circumferential arc;

a depression is formed along a portion of the channel; and the post is configured to contact the channel surface when the cap is rotatably mounted onto the container, whereby rotation of the cap upon the container in a first rotational direction selectively engages the post with the channel surface so as to prevent axial movement of the cap relative to the container, and whereby rotation of the cap upon the container in an opposite second rotational direction selectively positions the post within the channel adjacent to the depression so as to allow axial movement of the cap toward the container.

4. The apparatus of claim 1 wherein:

the valving means comprises a piston axially shiftable between a closed position and an open position;

a means for biasing the piston toward the closed position is configured to engage the piston and the container; and the actuating means comprises a longitudinal member formed with at least one laterally-projecting tab configured to engage the piston and shift the piston to the open position upon axial movement of the cap toward the container.

5. The apparatus of claim 4 wherein:

the container is formed with a reservoir and a piston bore in fluid communication therewith;

the piston is slidably positioned within the piston bore; and the piston is configured with a through-passage configured to alternately be sealed by the piston bore when the piston is in the closed position and be clear of the piston bore and in fluid communication with the reservoir when the piston is in the open position so as to cause the reservoir to be in fluid communication with the cap through the through-passage.

6. The apparatus of claim 5 wherein the cap is formed with a longitudinally-projecting conical nozzle having a plurality of apertures thereabout in fluid communication with the valving means.

7. The apparatus of claim 4 wherein the biasing means is a compression spring.

8. The apparatus of claim 1 wherein:

the cap is formed with a longitudinally-projecting nozzle having a conical surface;

a plurality of apertures positioned in spaced apart locations on the conical surface are formed in the nozzle so as to be in fluid communication with the valving means.

9. The apparatus of claim 8 wherein the nozzle is further formed with a spiral thread.

10. The apparatus of claim 1 wherein:

the container is formed with a substantially cylindrical wall so as to have a cylindrical outer surface;

the cap is formed with a downwardly-projecting circumferential skirt having an inner surface configured to be positioned circumferentially about a portion of the outer surface when the cap is rotatably mounted on the container;

the first engaging means comprises an outwardly-opening circumferential groove formed in the outer surface; and the second engaging means comprises an inwardly-projecting circumferential ring formed on the inner surface and configured to engage the groove.

11. The apparatus of claim 10 wherein:

the groove defines a groove width;

the ring defines a ring width; and the groove width is greater than the ring width so as to allow the ring to axially slidably engage the groove, whereby the cap moves axially on the container limited by the engagement of the ring within the groove.

12. The apparatus of claim 11 wherein:

the container is formed with a reservoir and a piston bore in fluid communication therewith;

the valving means comprises a piston slidably positioned within the piston bore so as to be axially shiftable between a closed position and an open position, the piston being configured with a distal piston end and a proximal piston end and a through-passage therebetween, the through-passage alternately being sealed by the piston bore when the piston is in the closed position and being clear of the piston bore and in fluid communication with the reservoir when the piston is in the open position;

a spring engages the piston and the piston bore and biases the piston toward the first closed position; and the actuating means comprises a tubular member having an inner lumen formed with at least one inwardly-projecting tab configured to engage the piston and shift the piston to the open position upon axial movement of the cap toward the container so as to cause the reservoir to be in fluid communication with the inner lumen through the through-passage.

13. An apparatus for dispensing fluids into an air line, comprising:

a container having a means for valving so as to selectively open the container to allow flow of fluids therefrom, the container being formed on an upwardly-facing surface with a circumferential channel having an upwardly-opening depression formed along a portion thereof, the container being further formed with a first means for engaging; and a cap having a second means for engaging configured to engage the first engaging means so as to rotatably mount the cap onto the container, the cap being formed with a longitudinally-projecting conical nozzle having a plurality of apertures in fluid communication with the valving means, the cap being configured with a downwardly-projecting post configured to project into the channel when the cap is rotatably mounted onto the container, whereby rotation of the cap upon the container in a first rotational direction selectively engages the post with the channel so as to prevent axial movement of the cap relative to the container, and whereby rotation of the cap upon the container in an opposite second rotational direction selectively positions the post within the channel adjacent to the depression so as to allow axial movement of the cap toward the container, the cap being further configured with a means for actuating the valving means when the cap is moved axially toward the container.

14. An apparatus for dispensing fluids into an air line, comprising:

a container;

a conical nozzle in selective fluid communication with the container, the nozzle having a conical wall defining an outer conical surface and an inner conical surface, the conical wall being formed with a plurality of apertures so as to communicate between the outer conical surface and the inner conical surface, the nozzle being further formed on its outer conical surface with a spiral thread; and a means for valving the container mounted between the container and the nozzle so as to selectively control the flow of fluids from the container to the nozzle.

15. The apparatus of claim 14 wherein:

the container is configured on an upwardly-facing surface with a circumferential channel having an upwardly-facing channel surface and a depression formed along a portion thereof, the container being further configured with a first means for engaging;

the nozzle is configured as a cap having a second means for engaging configured to engage the first engaging means so as to rotatably mount the cap onto the container, the cap being formed with a downwardly-projecting post configured to contact the channel surface when the cap is rotatably mounted onto the container, whereby rotation of the cap upon the container in a first rotational direction selectively engages the post with the channel surface so as to prevent axial movement of the cap relative to the container, and whereby rotation of the cap upon the container in an opposite second rotational direction selectively positions the post within the channel adjacent to the depression so as to allow axial movement of the cap toward the container, the cap being further configured with a means for actuating the valving means when the cap is moved axially toward the container.

16. The apparatus of claim 14 wherein:

a fluid line is attached to the container and to the nozzle so as to communicate therebetween; and the valving means is installed in the fluid line.

* * * * *